C. Britain,
Dish Drainer,

No. 43,088. Patented June 14, 1864.

UNITED STATES PATENT OFFICE.

CLARISSA BRITAIN, OF ST. JOSEPH, MICHIGAN.

IMPROVED DISH-DRAINER.

Specification forming part of Letters Patent No. 43,088, dated June 14, 1864.

*To all whom it may concern:*

Be it known that I, CLARISSA BRITAIN, of St. Joseph, county of Berrien, State of Michigan, have invented a new and Improved Dish-Drainer; and I do hereby declare that the following is a full, clear, and exact description thereof, reference being had to the accompanying drawings, making a part of this specification, in which—

Figure 1:
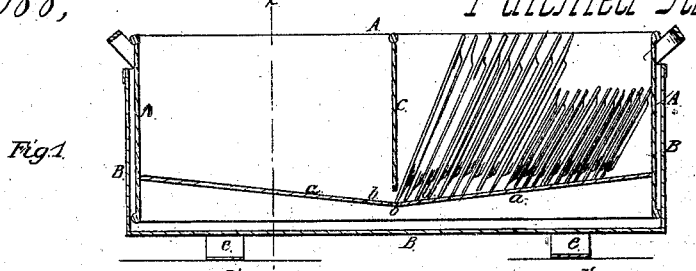
Figure 2:
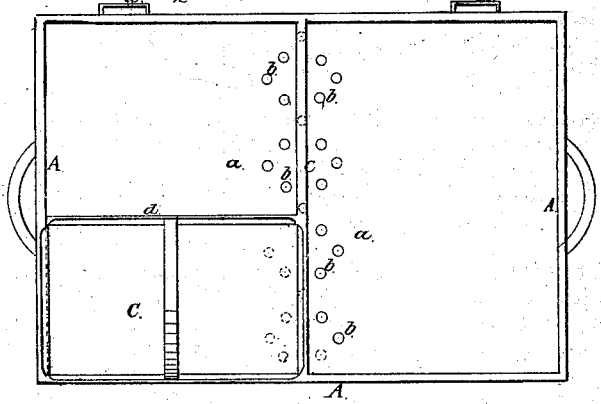
Figure 3:
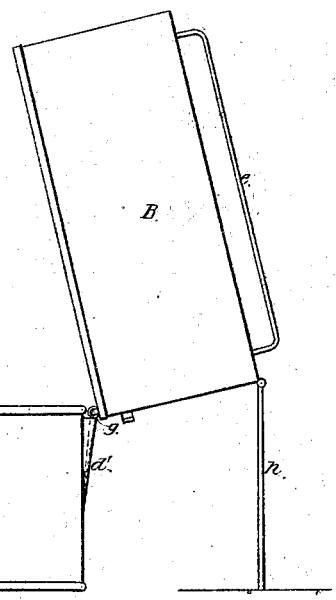
Figure 4:
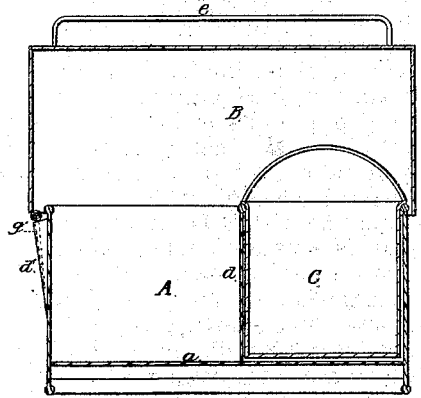

Figure 1 is a vertical longitudinal section of my improved apparatus for draining dishes. Fig. 2 is a top view of same. Fig. 3 shows the reflecting-box applied, and Fig. 4 shows the application of the reflector as a cover for the dish-washer.

Similar letters of reference indicate corresponding parts in the several figures.

The object of my invention is to introduce into the kitchen department a simple and cheap utensil for drying dishes after they have been washed, by means of which the laborious operation of draining and drying such articles by wiping each one with a cloth is rendered unnecessary and the work performed in a more rapid and cleanly manner, as will be hereinafter described.

To enable others skilled in the art to understand my invention, I will describe its construction and operation.

The apparatus consists, essentially, of two open rectangular boxes, made of sheet metal, one of which is of sufficient size to receive the other within it, as shown in Figs. 1 and 4. The smallest box A is constructed with a double-inclined bottom, *a*, or a bottom inclining from its ends to its center, as shown in Fig. 1, terminating at the lowest point in perforations *b b*, or, if desirable, a transverse opening, through which the water draining from the dishes is allowed to escape. This box is separated into two apartments by a central division-plate, *c*, and one of these apartments is subdivided by the plate *d*. These three apartments are each adapted to receive plates, dishes, or other such articles after they are washed, the water running down the inclined surfaces of the bottom *a* and escaping therefrom, as above described. The smallest apartment in this box A has fitted within it a bucket, C, having a bail applied to it by which the bucket can be readily removed from the box. This bucket C is merely an appliance to the box A, for receiving and holding knives and forks, spoons, and other small articles after they are washed and dried, and it may be dispensed with.

The box A is provided with handles on its ends and two or more sockets, *d' d'*, on one side near its upper edge, as shown in Figs. 2, 3, and 4.

The box B is constructed of tinned iron or some other suitable sheet metal, burnished on its inside surface, so that it will readily reflect heat. This box B is furnished with two transverse loops, *e e*, which serve the purposes of legs, as in the arrangement of Fig. 1, and as handles, as in the arrangement of Fig. 4, where the box B is used as a cover for the box A. The two hinged plates *g g*, applied to the edge of the opening in box B, are received by the socket portions *d' d'* on box A, and serve to attach the two boxes together, as shown in Figs. 3 and 4, while the leg *h* serves as a prop for the box B when it is used as a reflector, as shown in Fig. 3.

In Fig. 1 I have represented the box A arranged within the box B, for the purpose of catching the water drained from the dishes; but where kitchens are supplied with sinks for carrying off dirty water the box A may be arranged over or within a sink-box, and B need not be used for this purpose. After the dishes are washed they are set upon their edges within the apartments of the box A and the water drained off as described. The box B is then attached to A by the hinged plates *g g*, and the whole brought near a stove, and the box B adjusted at such angle as will cause it to reflect the heat from the stove upon the dishes contained in box A. By these means all the dishes of one washing may be drained and dried in a very rapid manner, after which the reflector can be used as a cover for the drainer A, to protect it from dust and dirt.

What I claim, and desire to secure by Letters Patent, is—

1. An apparatus for draining and drying dishes and other articles, consisting of a box, A, having a perforated inclined bottom, *a*, and one or more partitions, *c d*, substantially as described.

2. The combination of a drainer, A, with a reflecting-cover, B, substantially as described.

3. Providing the drainer A and reflector B with detachable hinges and receiving-socket portions, substantially as and for the purposes described.

4. A draining and drying apparatus, constructed and operating substantially as described.

Witness my hand in matter of my application for a patent for an improved "drainer."

CLARISSA BRITAIN.

Witnesses:
R. T. CAMPBELL,
E. SCHAFER.